United States Patent

Genzel et al.

[11] Patent Number: 5,556,346
[45] Date of Patent: Sep. 17, 1996

[54] PRETENSIONING FORCE ADJUSTMENT OF CONTINUOUSLY VARIABLE TRANSMISSION

[75] Inventors: Michael Genzel, Rosstal; Gerhard Hettich, Dietenhofen; Norbert Ramm, Braunschweig, all of Germany

[73] Assignee: Temic Telefunken Microelectronic GmbH, Heilbronn, Germany

[21] Appl. No.: 440,927

[22] Filed: May 15, 1995

[30] Foreign Application Priority Data

May 18, 1994 [DE] Germany ............... 44 17 346.6

[51] Int. Cl.⁶ ........................................... F16H 59/00
[52] U.S. Cl. ................................... 474/28; 474/18
[58] Field of Search ............... 474/18, 28, 29, 474/31, 46, 37

[56] References Cited

U.S. PATENT DOCUMENTS

| | | | |
|---|---|---|---|
| 3,097,540 | 7/1963 | Berens | 474/31 X |
| 3,136,169 | 6/1964 | Karger et al. | 474/31 X |
| 3,138,033 | 6/1964 | Glasson et al. | 474/31 |
| 3,190,136 | 6/1965 | Steuer | 474/31 |
| 3,349,633 | 10/1967 | Petersen et al. | 474/31 |
| 3,731,549 | 5/1973 | Kaiser et al. | 474/31 X |
| 4,619,629 | 10/1986 | Shigematsu et al. | 474/28 |
| 4,631,043 | 12/1986 | Tokoro et al. | 474/18 |
| 5,098,345 | 3/1992 | Van Vuuren | 474/8 |
| 5,145,465 | 9/1992 | Hendriks | 474/101 |
| 5,182,968 | 2/1993 | Mott | 474/18 X |

FOREIGN PATENT DOCUMENTS

| | | |
|---|---|---|
| 0228199 | 7/1987 | European Pat. Off. . |
| 0634590 | 1/1995 | European Pat. Off. . |
| 4205272 | 8/1993 | Germany . |

OTHER PUBLICATIONS

O. Lutz: "Zur Theorie des Keilscheiben–Umschlingungs--getriebes". In: Konstruktion, vol. 12, 1960, No. 7, pp. 265–268.

Primary Examiner—Roger J. Schoeppel
Attorney, Agent, or Firm—Spencer & Frank

[57] ABSTRACT

A process to adjust the pretensioning force for the transmission element of a continuously variable transmission, complete with two disc assemblies comprising two discs each, will be described. For optimized specification of the pretensioning force, the following process steps will be provided:

a) determining transmission element length,
b) specifying a start value for the pretensioning force,
c) reducing the pretensioning force and determining transmission element virtual length,
d) determining transmission element slip status by comparing actual length and virtual length of the transmission element,
e) changing pretensioning force in relation to slip status, whereby, if actual length and virtual length of the transmission element correspond, the pretensioning force will be decreased, and, if actual length and virtual length of the transmission element differ, the pretensioning force will be increased.

11 Claims, 2 Drawing Sheets

5,556,346

PRETENSIONING FORCE ADJUSTMENT OF CONTINUOUSLY VARIABLE TRANSMISSION

BACKGROUND OF THE INVENTION

In many applications, it is important to optimize the interplay of an engine and its associated transmission—for instance, to reduce fuel consumption in motor vehicles it will be necessary not only to improve engine control systems but also to adapt transmission ratios. To achieve this, automatic transmissions present themselves as a solution, with CVTs (continuously variable transmissions) in particular being increasingly used. This type of transmission allows continuous adaptation of transmission ratios by means of a transmission element (chain, band, belt, etc) located between the discs of two disc assemblies. By applying the same contact pressure values on these two disc assemblies—this corresponds to the so-called pretensioning force—the force level for this transmission element will be adjusted. Specifying different values for this contact pressure on the two disc assemblies will create an additional transport force component for moving this transmission element; by varying this contact pressure, and thus the transport force, the transmission ratio may be continuously varied in any number of steps.

However, the problem here is that, when the transmission element slides (i.e. when excessive slip occurs), disc assemblies and the transmission element may be damaged. To prevent the transmission element from sliding, therefore, a high pretensioning force is specified; but this reduces transmission efficiency on the one hand and its service life on the other.

SUMMARY OF THE INVENTION

The object of this invention is to provide a method of adjusting a pretensioning force for a transmission element of a continuously variable transmission. The continuously variable transmission has two disc assemblies. Each disc assemblies has two discs axially movable relative to one another by applying a contact force thereto. The transmission element connects the two disc assemblies together. This method avoids the aforementioned disadvantages and, rather, provides advantageous properties.

According to this invention, this task will be solved by the following steps: an actual length of the transmission element is determined. An initial pretensioning force is determined and applied to both of the disc assemblies. The initial pretensioning force is selected so that excessive slip does not occur between the discs and the transmission element. The initial pretensioning force is reduced to a reduced pretensioning force. A theoretical length of the transmission element is determined during a movement of the transmission element. The theoretical length is a length at which excessive slip does not occur between the discs and the transmission element. The actual length of the transmission element is compared with the theoretical length of the transmission element to determine a slip status of the transmission element. The reduced pretensioning force is changed in dependence on the slip status by performing one of the following steps: the reduced pretensioning force is decreased when the actual length of the transmission element and the theoretical length of the transmission element are the same. Alternatively, the reduced pretensioning force is increased when the actual length of the transmission element and the theoretical length of the transmission element are different.

In the process presented here—after determining or in order to determine transmission element length—a pretensioning force will be applied to the two disc assemblies, with this force being selected such that no excessive slip will occur when it is applied (to this end, for instance, maximum contact pressure may be selected as pretensioning force). This pretensioning force serves as a start value for an adjustment: beginning with this start value, the pretensioning force will be varied—whilst simultaneously transmission element virtual (theoretical) length arising from the movement of this transmission element will be measured; if its (real) length and transmission element virtual length agree, pretensioning force will be reduced; if, however, its (real) length and transmission element virtual length differ—this is an indication of excessive slip occurring the pretensioning force applied to the transmission element will be increased. Preferably, any increase in pretensioning force will be effected in larger steps than a reduction in pretensioning force. Thus, by continuously measuring transmission element virtual length, system slip status will be continuously determined, and based on these results, the pretensioning force will be adapted to current requirements.

This adjustment process will therefore provide an optimum pretensioning force under any and all operating conditions, and thus prevent excessive slip from occurring over an extended period due to pretensioning force having been set too low, and/or avoid a reduction in service life or transmission efficiency due to pretensioning force having been set too high.

The process presented here will be suitable for all transmission traits where contact pressure and thus the pretensioning force applied to the transmission element can be varied—in hydraulic transmission systems, for instance, by applying pressures.

BRIEF DESCRIPTION OF THE DRAWINGS

In the following, the process will be described in detail using an implementation example, as illustrated in the drawing, for a pressure-operated (pneumatic) transmission.

DESCRIPTION OF A PREFERRED EMBODIMENT

Figure 1:
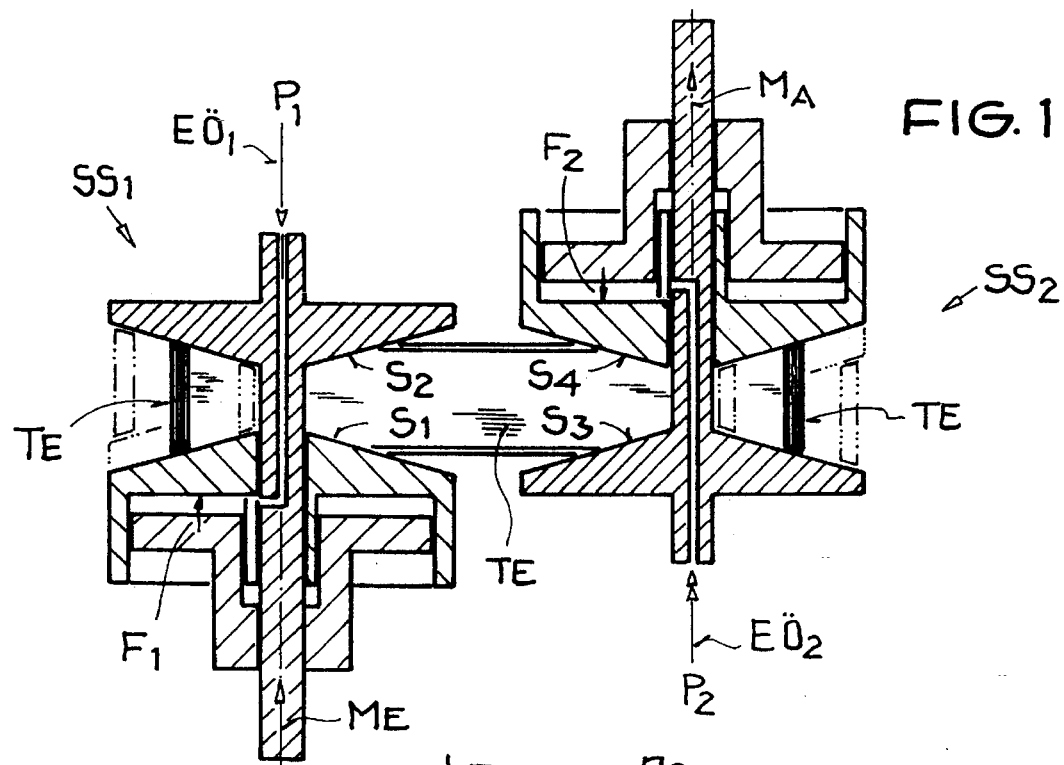
FIG. 1 shows a schematic of a continuously variable pneumatic transmission for motor vehicles in side view.
Figure 2:
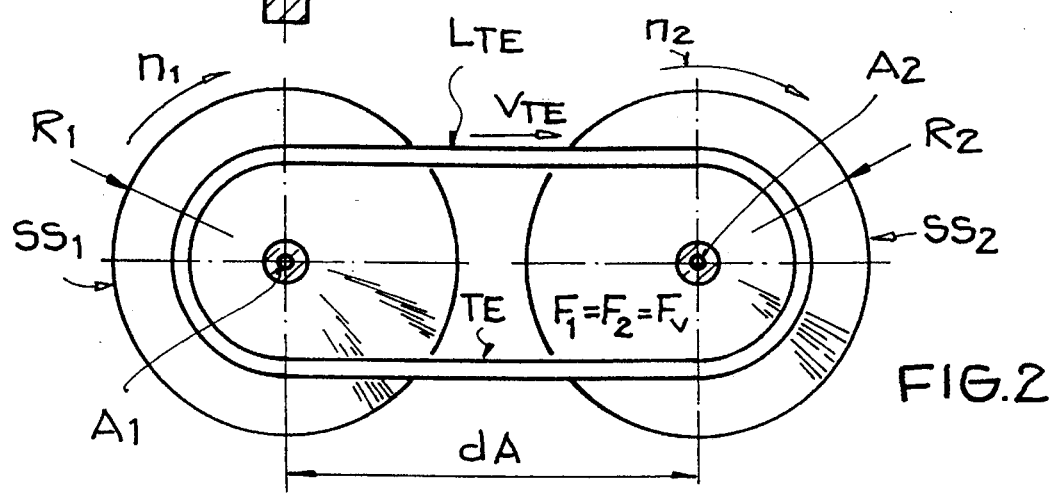
FIG. 2 and FIG. 3 each show a cross-sectional drawing of this transmission.
Figure 3:
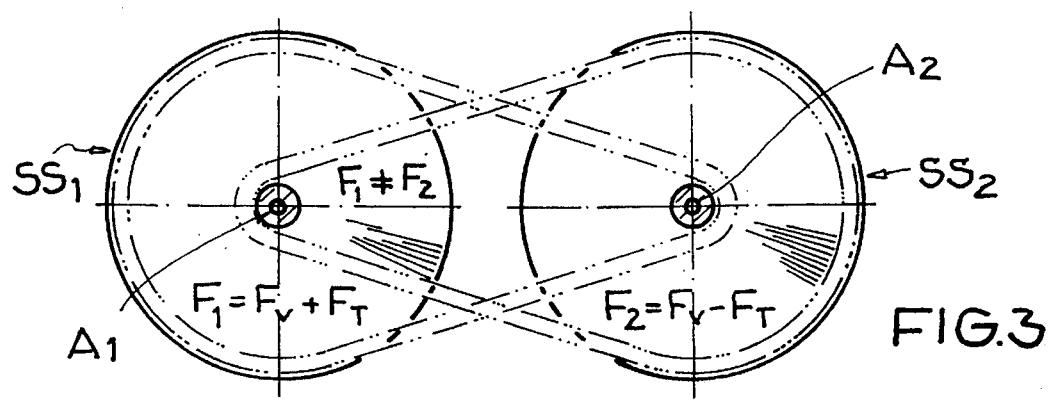

According to FIG. 1, this continuously variable transmission as torque converter of the input torque $M_E$ into the output torque $M_A$ comprises two disc assemblies SS1 or SS2 with two discs S1, S2, or S3, S4 each. Between these discs S1, S2, or S3, S4 of the two disc assemblies SS1 or SS2 a transmission element TE, taking the form of a chain, will rim. At the two inlet apertures EÖ1, EÖ2, it is possible—for instance, by pressing in oil—to vary pressure $p_1$, $p_2$ onto the two discs S1 or S4 of the two disc assemblies SS1 or SS2. To specify a certain pretensioning force $F_V$, the same pressure value $p_1=p_2$ will be applied to the two disc assemblies SS1 or SS2—via the two inlet apertures EÖ1 or EÖ2; this will cause the same contact pressure (i.e., contact forces) $F_1$, $F_2$ to be set for the two disc assemblies SS1, SS2 and thus the transmission element TE to be pretensioned with pretensioning force $F_v=F_1=F_2$ as shown in FIG. 2. If, however, different contact pressures (i.e., contact forces) $F_1 \neq F_2$ are applied to the two disc assemblies SS1 and SS2 by specifying different pressure values $p_1 \neq p_2$ (see FIG. 3), this will yield a force component as transport force $F_T$ causing transmission element TE to move (here, the following equation holds: contact pressure $F_1$, $F_2$=pretensioning force $F_V \pm$ transport force $F_T$). By varying contact pressures $F_1$, $F_2$, and thereby transport force $F_T$, the movement of transmission element TE (chain) will be altered; this will cause the transmission ratio and torque conversion to be varied in continuous steps.

Transmission element length $L_{TE}$ (chain length) may be represented as a function of the radii $R_1$, $R_2$ of the two disc assemblies SS1, SS2 and the (specified and known) distance $d_A$ of axle centres (axles A1, A2) in the two disc assemblies SS1, SS2; and, in their turn, these radii $R_1$, $R_2$ of disc assemblies SS1, SS2 will again be dependent on speeds $n_1$, $n_2$ of these two disc assemblies SS1, SS2 and on running speed $V_{TE}$ of transmission element TE (chain speed). Therefore, to identify system slip status by determining the apparent length or virtual length (i.e., the theoretical length of the transmission element at which excessive slip does not occur). $L_V$ of transmission element TE, arising during operation, speeds $n_1$, $n_2$ of the two disc assemblies SS1, SS2 and running speed $V_{TE}$ must be measured: for instance, speeds $n_1$, $n_2$ will be determined by speed sensors and segmented measuring wheels; and to determine running speed $V_{TE}$ a speed sensor centrally mounted between axles A1, A2 may be provided, for example, which determines the change in magnetic properties generated by the movement of transmission element TE.

Figure 4:
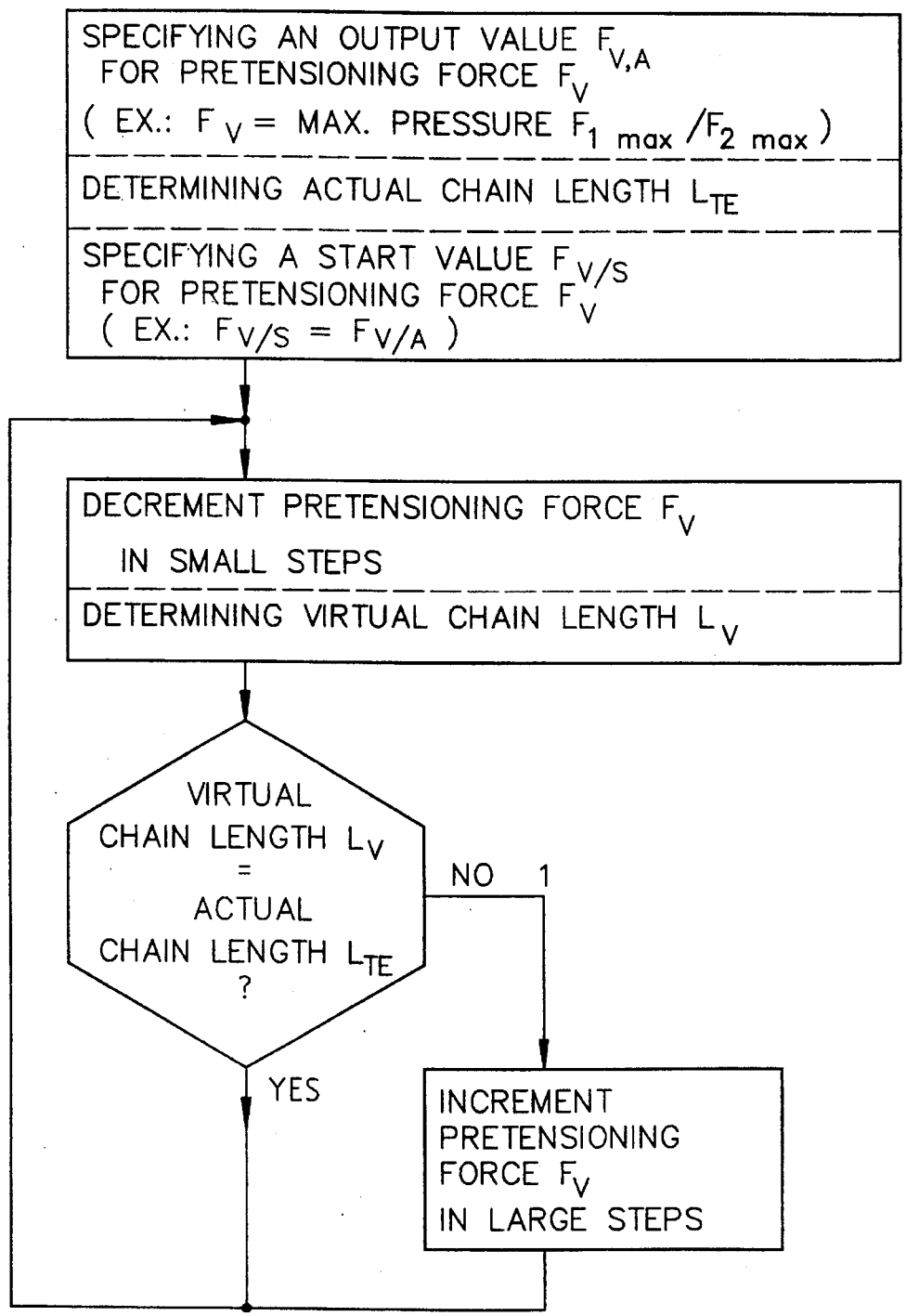
FIG. 4 shows a process diagram for pretensioning force adjustment.

For a transmission element taking the form of a chain, the following adjustment process is to be provided to optimize specification of pretensioning force $F_V$ onto the two disc assemblies SS1 or SS2—as illustrated in the flow chart of FIG. 4:

as output value $F_{V,A}$ for pretensioning force $F_V$ a high value will be specified—thus, for example, $F_{V,A}$ is the maximum possible contact pressure $F_{1max}$, $F_{2max}$—, and at this pretensioning force $F_{V,A}$ actual chain length $L_{TE}$ will be determined; this output value $F_{V,A}$ for pretensioning force $F_V$ will be accepted as start value $F_{V,S}$ for adjusting pretensioning force $F_V$, starting from this value, pretensioning force $F_V$ will be decremented in small steps and virtual chain length $L_V$ continuously determined by measuring speeds $n_1$, $n_2$ of disc assemblies SS1, SS2, and chain speed $V_{TE}$, this virtual chain length $L_V$ will be compared with (actual) chain length $L_{TE}$, and on the basis of this comparison, system slip status will be determined, if this slip status is known, the pressure level, and thus the force level also, will be varied by appropriate changes in pretensioning force: either by increasing (incrementing) pretensioning force $F_V$ in large steps (in the event of excessive slip occurring, i.e. $L_{TE} \neq L_V$), or by reducing (decrementing) pretensioning force $F_V$ in small steps (in the event of no excessive slip having occurred, i.e. $L_{TE} = L_V$).

Provided slip is distributed across both disc assemblies SS1, SS2, the absolute amount of slip can be determined by calculation. Optimum pretensioning force $F_V$ onto transmission element TE will be selected as a slightly higher value than the force value at which excessive slip begins to occur, i.e. the transmission element (the chain, for example) begins to slide. Pretensioning force $F_V$—and thus contact pressures $F_1$, $F_2$ also—can therefore be optimally specified under all external conditions and for all changes in external circumstances—such as varying transmission ratios, varying road surface conditions, varying driving conditions, etc.

What is claimed is:

1. A method of adjusting a pretensioning force for a transmission element of a continuously variable transmission, the continuously variable transmission having two disc assemblies, each disc assembly having two discs axially movable relative to one another by applying a contact force thereto, the transmission element connecting the two disc assemblies together, comprising the steps of:

A) determining an actual length of the transmission element;

B) determining an initial pretensioning force and applying the initial pretensioning force to both of the disc assemblies, the initial pretensioning force being selected so that excessive slip does not occur between the discs and the transmission element;

C) reducing the initial pretensioning force to a reduced pretensioning force;

D) determining a theoretical length of the transmission element during a movement of the transmission element, the theoretical length being a length at which excessive slip does not occur between the discs and the transmission element;

E) comparing the actual length of the transmission element with the theoretical length of the transmission element to determine a slip status of the transmission element; and F) changing the reduced pretensioning force in dependence on the slip status by performing one of the following steps:

decreasing the reduced pretensioning force when the actual length of the transmission element and the theoretical length of the transmission element are the same; and increasing the reduced pretensioning force when the actual length of the transmission element and the theoretical length of the transmission element are different.

2. The method defined in claim 1, wherein step A is performed while applying a predetermined pretensioning force to the disc assemblies.

3. The method defined in claim 2, wherein the predetermined pretensioning force and the initial pretensioning force are the same.

4. The method defined in claim 3, wherein the predetermined pretensioning force is the same as a maximum contact force applied to the discs.

5. The method defined in claim 1, wherein the increasing of the reduced pretensioning force is effected in larger increments than the reduction of the initial pretensioning force.

6. The method defined in claim 1, wherein the actual length and the theoretical length of the transmission element are mathematically determined by the step of measuring rotational speeds of the disc assemblies, and a running speed of the transmission element.

7. The method defined in claim 6, wherein said measuring step is performed using speed sensors.

8. The method defined in claim 1, wherein the actual length of the transmission element is determined at each startup of the continuously variable transmission, and is regarded as a constant.

9. A method of adjusting a pretensioning force for a transmission element of a continuously variable transmission in a motor vehicle, the continuously variable transmission having two disc assemblies, each disc assembly having two discs axially movable relative to one another by applying a contact force thereto, the transmission element connecting the two disc assemblies together, comprising the steps of:

A) determining an actual length of the transmission element;

B) determining an initial pretensioning force and applying the initial pretensioning force to both of the disc assemblies, the initial pretensioning force being selected so that excessive slip does not occur between the discs and the transmission element;

C) reducing the initial pretensioning force to a reduced pretensioning force;

D) determining a theoretical length of the transmission element during a movement of the transmission element, the theoretical length being a length at which excessive slip does not occur between the discs and the transmission element;

E) comparing the actual length of the transmission element with the theoretical length of the transmission element to determine a slip status of the transmission element; and F) changing the reduced pretensioning force in dependence on the slip status by performing one of the following steps:
decreasing the reduced pretensioning force when the actual length of the transmission element and the theoretical length of the transmission element are the same; and
increasing the reduced pretensioning force when the actual length of the transmission element and the theoretical length of the transmission element are different.

10. The method defined in claim 9, wherein the actual length of the transmission element is determined when a transmission control device in the motor vehicle is switched on.

11. A method of adjusting a pretensioning force for a transmission element of a continuously variable transmission, the continuously variable transmission having two disc assemblies, each disc assembly having two discs axially movable relative to one another by applying a contact force thereto so as to adjust a transmission ratio, the transmission element connecting the two disc assemblies together, comprising the steps of:

A) determining an actual length of the transmission element;

B) determining an initial pretensioning force and applying the initial pretensioning force to both of the disc assemblies, the initial pretensioning force being selected so that excessive slip does not occur between the discs and the transmission element;

C) axially moving the discs of the respective disc assemblies to perform a step of adjusting the transmission ratio of the continuously variable transmission;

D) reducing the initial pretensioning force to a reduced pretensioning force;

E) determining a theoretical length of the transmission element during a movement of the transmission element, the theoretical length being a length at which excessive slip does not occur between the discs and the transmission element;

F) comparing the actual length of the transmission element with the theoretical length of the transmission element to determine a slip status of the transmission element; and G) changing the reduced pretensioning force in dependence on the slip status by performing one of the following steps:
decreasing the reduced pretensioning force when the actual length of the transmission element and the theoretical length of the transmission element are the same, and reperforming steps E through G; and
increasing the reduced pretensioning force when the actual length of the transmission element and the theoretical length of the transmission element are different, decreasing the reduced pretensioning force, and reperforming steps E through G.

* * * * *